US012285638B2

(12) United States Patent
Austrheim

(10) Patent No.: US 12,285,638 B2
(45) Date of Patent: Apr. 29, 2025

(54) AUTOMATED STORAGE AND RETRIEVAL SYSTEM COMPRISING A FLOW PATH EXTENDING THROUGH A PLURALITY OF STACKED CONTAINERS

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 346 days.

(21) Appl. No.: 17/597,972

(22) PCT Filed: Aug. 3, 2020

(86) PCT No.: PCT/EP2020/071793
§ 371 (c)(1),
(2) Date: Jan. 31, 2022

(87) PCT Pub. No.: WO2021/037488
PCT Pub. Date: Mar. 4, 2021

(65) Prior Publication Data
US 2022/0266077 A1     Aug. 25, 2022

(30) Foreign Application Priority Data
Aug. 27, 2019   (NO) .................................. 20191031

(51) Int. Cl.
 *A62C 3/00*   (2006.01)
 *B65G 1/04*   (2006.01)
(52) U.S. Cl.
 CPC ............ *A62C 3/002* (2013.01); *B65G 1/0464* (2013.01); *B65G 2207/22* (2013.01)

(58) Field of Classification Search
 CPC ... A62C 3/002; B65G 2207/22; B65G 1/0464
 See application file for complete search history.

(56) References Cited

U.S. PATENT DOCUMENTS 3,393,858 A * 7/1968 Heel .................... B65D 5/4295
                                                     217/42
3,539,108 A * 11/1970 Lillibridge ............... B65G 1/02
                                                     169/16
(Continued)

FOREIGN PATENT DOCUMENTS

CN         107428467 A     12/2017
CN         107429512 A     12/2017
(Continued)

OTHER PUBLICATIONS

International Search Report issued in International Application No. PCT/EP2020/071793, mailed Oct. 20, 2020 (5 pages).
(Continued)

*Primary Examiner* — Joseph A Greenlund
(74) *Attorney, Agent, or Firm* — Baker Botts L.L.P.

(57) ABSTRACT

An automated grid based storage and retrieval system includes a storage grid and a plurality of storage containers for storing product items therein. In the storage grid, the storage containers are stacked vertically in stacks arranged beneath openings of a grid-based rail system to provide storage columns of a storage volume. The storage volume includes a flow path extending through a plurality of the stacks. The flow path is formed by spacers positioned within the stacks. The spacers are configured to allow a fluid to flow through the spacer. Each spacer is stacked at a predetermined level between storage containers in a stack and adjacent another of the spacers in a neighboring stack to provide adjacent sections of the flow path.

11 Claims, 10 Drawing Sheets

(56) References Cited

U.S. PATENT DOCUMENTS

| | | | |
|---|---|---|---|
| 3,651,977 A | 3/1972 | Morgan | |
| 5,401,520 A * | 3/1995 | Skaar | A23L 3/365 99/474 |
| 7,953,514 B2 * | 5/2011 | Kim | B65G 1/0421 700/214 |
| 9,345,916 B1 * | 5/2016 | Kirkbride | A62C 3/002 |
| 10,549,914 B2 * | 2/2020 | Clarke | A62C 3/002 |
| 11,524,844 B2 * | 12/2022 | Clarke | A62C 99/0018 |
| 11,667,456 B2 * | 6/2023 | Lindbo | B65D 21/0209 62/407 |
| 2009/0112045 A1 * | 4/2009 | Mathis, Jr. | B65G 27/08 422/164 |
| 2011/0107784 A1 * | 5/2011 | Tippmann | F25D 17/06 62/340 |
| 2013/0126192 A1 * | 5/2013 | Bygbjerg | A62C 31/05 169/37 |
| 2013/0255288 A1 * | 10/2013 | Tippmann | F25D 31/00 62/99 |
| 2013/0270063 A1 * | 10/2013 | Yoshinaga | A62C 37/36 198/358 |
| 2015/0027739 A1 * | 1/2015 | Multer | A62C 35/58 169/37 |
| 2017/0086485 A1 * | 3/2017 | Tippmann | F25D 13/00 |
| 2017/0252592 A1 * | 9/2017 | Pigeon | A47B 97/00 |
| 2018/0044111 A1 * | 2/2018 | Clarke | A62C 3/002 |
| 2018/0050869 A1 * | 2/2018 | Lindbo | E04B 2/7403 |
| 2018/0051459 A1 * | 2/2018 | Clarke | B65G 1/0464 |
| 2018/0093828 A1 * | 4/2018 | Lindbo | B65G 1/0464 |
| 2018/0142947 A1 * | 5/2018 | Bates | F25D 25/005 |
| 2018/0362261 A1 * | 12/2018 | Rodenheber | F27D 3/123 |
| 2019/0031399 A1 * | 1/2019 | Shaikh | B65D 25/14 |
| 2020/0130934 A1 * | 4/2020 | Clarke | A62C 35/68 |
| 2022/0266077 A1 * | 8/2022 | Austrheim | A62C 3/002 |
| 2022/0281684 A1 * | 9/2022 | Fjeldheim | G06Q 10/08 |

FOREIGN PATENT DOCUMENTS

| | | |
|---|---|---|
| CN | 107466203 A | 12/2017 |
| CN | 108064213 A | 5/2018 |
| CN | 108382730 A | 8/2018 |
| JP | 2018519227 A | 7/2018 |
| NO | 317366 B1 | 10/2004 |
| WO | 2014075937 A1 | 5/2014 |
| WO | 2014090684 A1 | 6/2014 |
| WO | 2015193278 A1 | 12/2015 |
| WO | 2016166323 A1 | 10/2016 |
| WO | 2016193418 A1 | 12/2016 |
| WO | 2016193419 A1 | 12/2016 |

OTHER PUBLICATIONS

Written Opinion issued in International Application No. PCT/EP2020/071793; Dated Oct. 20, 2020 (6 pages).
Search Report issued in Norwegian Application No. 20191031; Dated Mar. 10, 2020 (2 pages)
Office Action issued in the counterpart Chinese Patent Application No. 2020800607249, mailed on Jul. 20, 2022 (12 pages).
Hoffert, Rudi, Examination Report for European Application No. 20 753 314.2-1017, mailed Mar. 22, 2024, European Patent Office, 5 pages.
Susumu Miyake, Notice of Reasons for Rejection for Japanese Patent Application No. 2022-512782, mailed Feb. 10, 2025, 7 pages (including translation), Japan Intellectual Property Office, 3-4-3 Kasumigaseki Chiyoda-ku. Tokyo 100-8915.

* cited by examiner

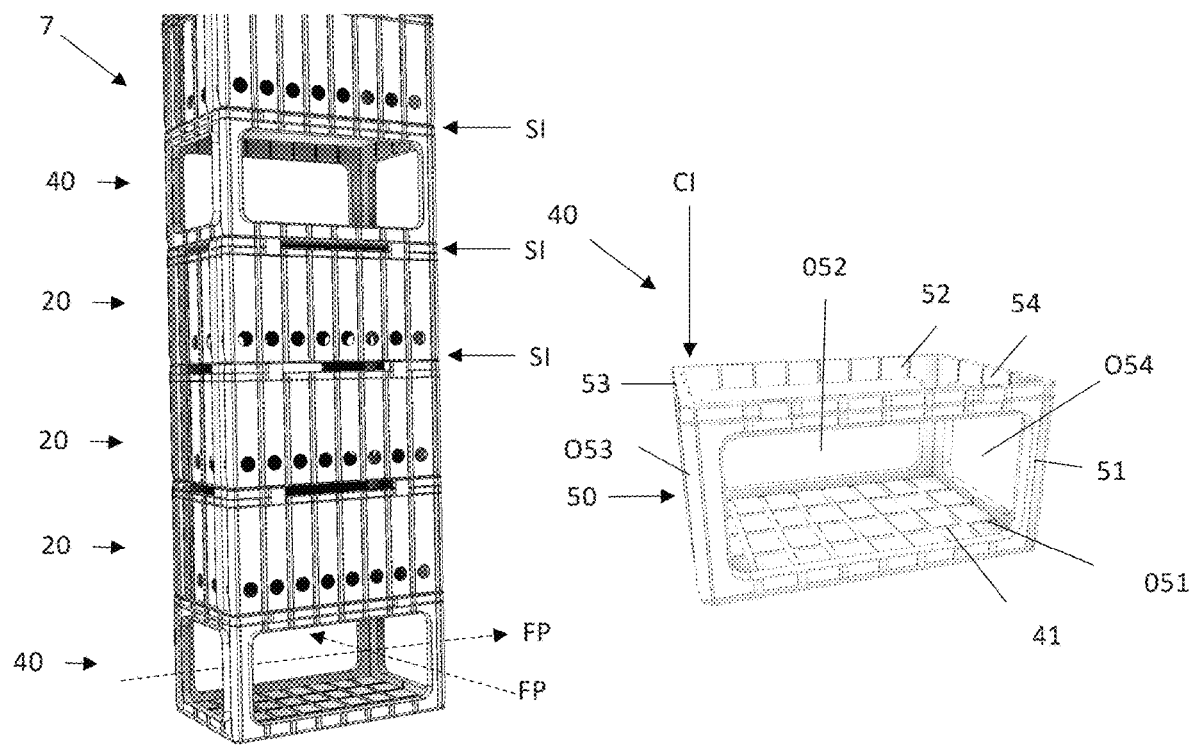
FIG. 9b
FIG. 9a
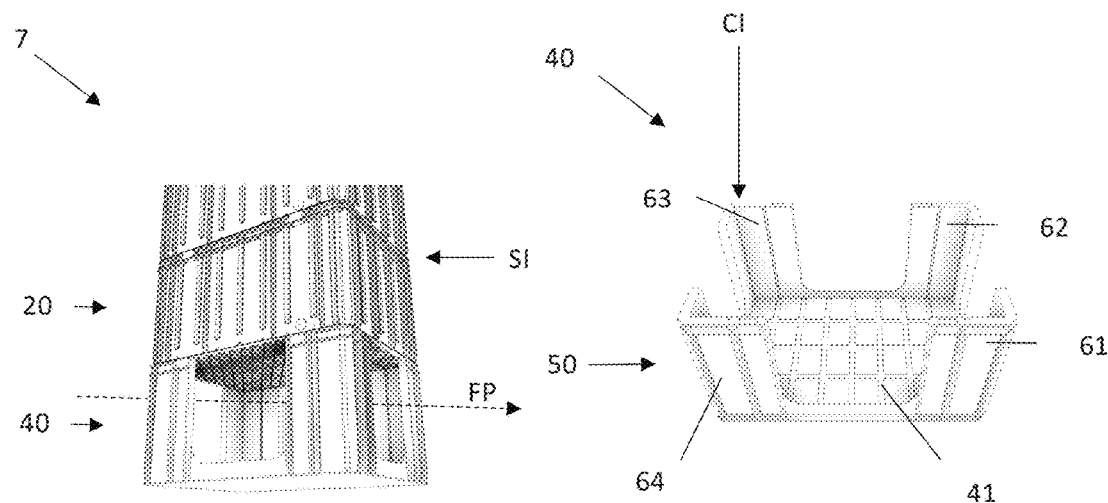
FIG. 10b
FIG. 10a

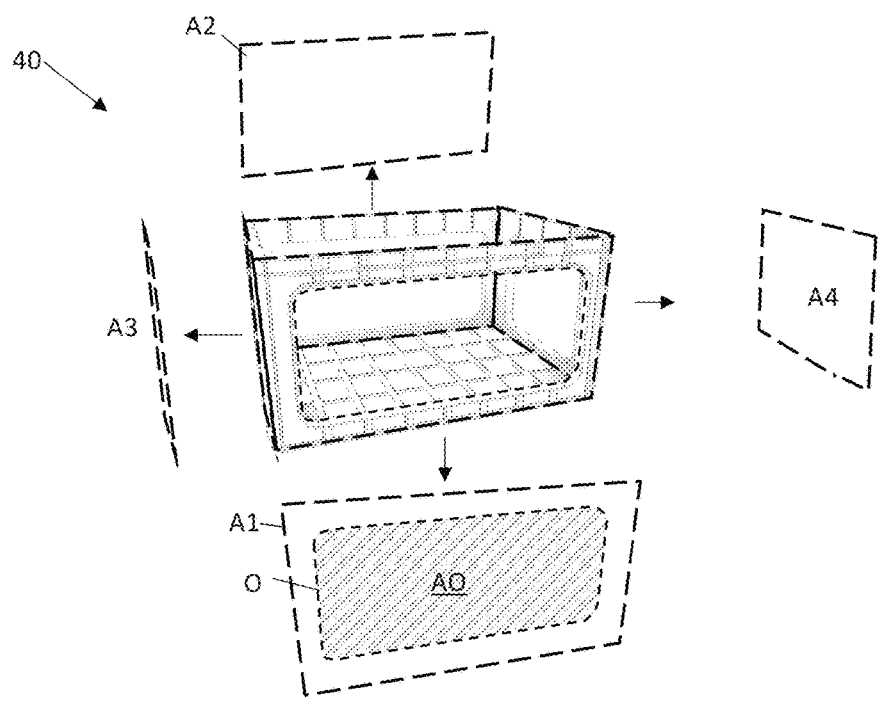
FIG. 15
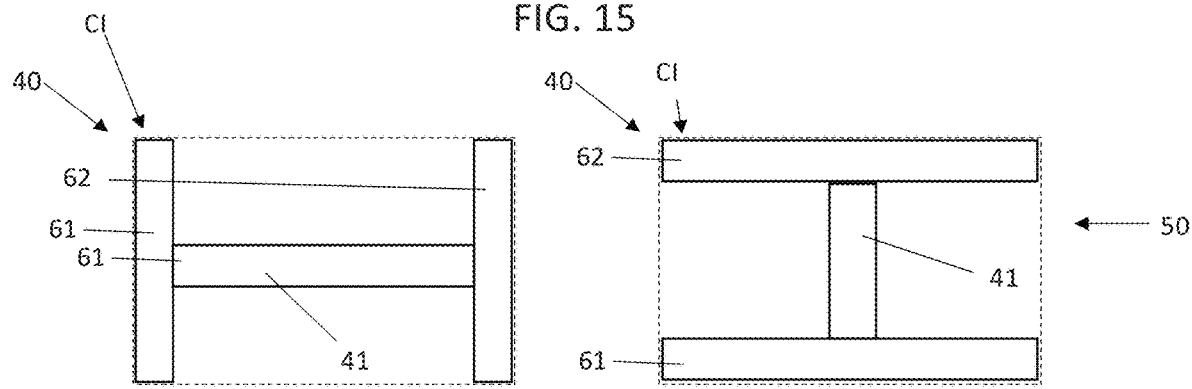
FIG. 16a  FIG. 16b
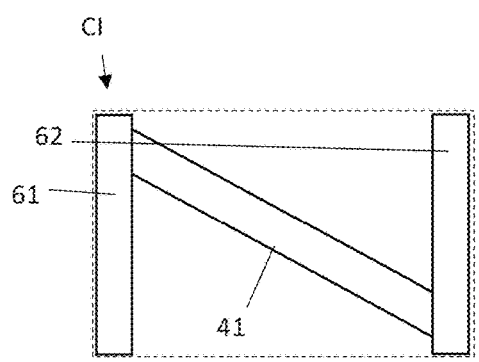 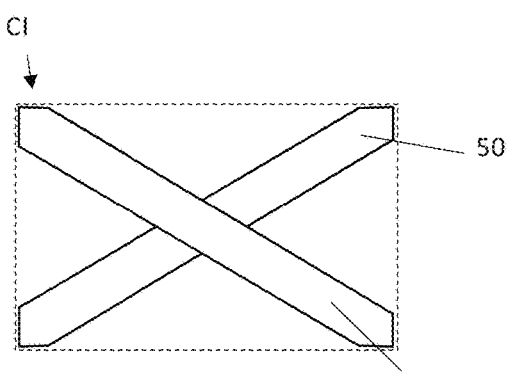
FIG. 16c  FIG. 16d

AUTOMATED STORAGE AND RETRIEVAL SYSTEM COMPRISING A FLOW PATH EXTENDING THROUGH A PLURALITY OF STACKED CONTAINERS

TECHNICAL FIELD

The present invention relates to an automated storage and retrieval system for storage and retrieval of containers, in particular to such a system in which it is possible to distribute gas (typically air) with desired properties to the containers stored within the system.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises a number of upright members 102 and a number of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201,301 are operated to raise storage containers 106 from, and lower storage containers 106 into, the storage columns 105, and also to transport the storage containers 106 above the storage columns 105.

The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. In this way, the rail system 108 defines grid columns 112 above which the container handling vehicles 201,301 can move laterally above the storage columns 105, i.e. in a plane which is parallel to the horizontal X-Y plane.

A control system 500 of the automated storage and retrieval system 1 is shown in communication with the vehicles 201, 301.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. Each set of wheels 201b,301b 201c,301c can be lifted and lowered, so that the first set of wheels 201b,301b and/or the second set of wheels 201c, 301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid disclosed in FIG. 1, Z=8 identifies the lowermost, bottom layer of the grid 104. Similarly, X=1 . . . n and Y=1 . . . n identifies the position of each grid column 112 in the horizontal plane. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 201,301 can be said to travel in layer Z=0, and each grid column 112 can be identified by its X and Y coordinates.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicles 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

The rail system 108 may be a single rail system, as is shown in FIG. 4. Alternatively, the rail system 108 may be a double rail system, as is shown in FIG. 5, thus allowing a container handling vehicle 201 having a footprint generally corresponding to the lateral area defined by a grid column 112 to travel along a row of grid columns even if another container handling vehicle 201 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of tracks 110a,110b of the first tracks 110 and a pair of tracks 111a,111b of the second set of tracks 111. In FIG. 5 the grid cell 122 is indicated by a dashed box.

Consequently, tracks 110a and 110b form pairs of tracks defining parallel rows of grid cells running in the X direction, and tracks 111a and 111b form pairs of tracks defining parallel rows of grid cells running in the Y direction.

As shown in FIG. 6, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space there-between.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201,301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119,120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119,120 for further transportation to an access station. Note that the term 'tilted' means transportation of storage containers 106 having a general transportation orientation somewhere between horizontal and vertical.

The grid 104 in FIG. 1 comprises two port columns 119 and 120. The first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 119,120 and the access station.

If the ports 119,120 and the access station are located at different levels, the conveyor system may comprise a lift device with a vertical component for transporting the storage containers 106 vertically between the port 119,120 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 201,301 is instructed to retrieve the target storage container 106 from its position in the grid 104 and transport it to the drop-off port 119. This operation involves moving the container handling vehicle 201,301 to a grid location above the storage column 105 in which the target storage container 106 is positioned, retrieving the storage container 106 from the storage column 105 using the container handling vehicle's 201,301 lifting device (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201,301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system which typically is computerized and which typically comprises a database for keeping track of the storage containers 106.

Some of the above systems 1 may be used to store product items which require a certain environment. For example, some types of food require a cool temperature environment (typically temperatures between 1° C.-6° C.), some types of food require an even colder temperature environment (typically temperatures lower than −15° C.). If living plants are stored in the system, then a desired gas mixture may be required (a certain mixture of oxygen, nitrogen and carbon dioxide). Such plants, and other product items, may also require a certain air humidity (moist air or dry air). Fire hazardous product items such as oil/gas containing products, fireworks etc. may advantageously be stored in an oxygen-free environment. Here, it may be desired to distribute a gas such as nitrogen into containers within the storage system. Nitrogen distribution into such a storage and retrieval system may also be relevant for extinguishing fires.

In buildings in which such storage systems are located, ventilation systems are typically used to provide the desired environment. However, as the purpose of such storage systems is to store the containers in stacks adjacent to each other, it is a challenge to provide the same environment for all product items stored in the storage system. In particular, it is difficult to provide containers in the middle of the grid with same environment as the containers in the periphery of the grid. Hence, one object of the present invention is to improve distribution of gas with desired properties to all containers stored within the system.

In WO 2016/193418 (Ocado Innovation Ltd), it is disclosed a storage system where the containers are cooled during storage in a grid. Here it is suggested to provide holes or apertures in the containers to allow cool air to flow through the containers in which the products items are stored. One object of the present invention is to provide a more effective gas distribution in this type of storage system.

SUMMARY OF THE INVENTION

The present invention is set forth and characterized in the independent claims, while the dependent claims describe other characteristics of the invention.

In one aspect, the present invention relates to a an automated grid based storage and retrieval system, comprising:
 a plurality of storage containers for storing product items therein; and
 a storage grid in which the storage containers are stacked vertically in stacks arranged beneath openings of a grid-based rail system to provide storage columns of a storage volume;
characterised in that the storage volume comprises a flow path extending through a plurality of the stacks, wherein the flow path is formed by spacers positioned within the stacks, the spacers being configured to allow a fluid to flow through the spacer, each spacer being stacked at a predetermined level between storage containers in a stack and adjacent another of the spacers in a neighboring stack to provide adjacent sections of the flow path.

The flow path therefore passes through the storage volume via a plurality of spacers, and hence passes through stacks. The spacers can be arranged as needed within the stacks to provide flow paths through or to predetermined regions of the storage volume.

In one aspect, each spacer is arranged to define a void within a stack by supporting one or more storage containers above the spacer to allow fluid flow through the stack via the spacer.

The spacers may therefore be arranged to provide empty space between stacked storage containers of a stack to allow a fluid to flow through. Each spacer may be formed as a frame for spacing storage containers in a stack. The spacers may be unsuitable for storing product items therein. For example, spacers may not have a base for carrying products therein, and/or may have substantially open sides. Openings in the sides may be at least 50% of the side's surface area, at least 70% of the side's surface area, at least 80% of the side's surface area, and/or at least 90% of the side's surface area. The spacers may comprise a single opening on each face. The spacer may correspond in size to that of a storage container, in particular may be of the same height so as to maintain a height of a row, e.g., in parts of a storage volume where the flow path does not extend.

The spacers may also comprise a connection interface configured to be connected to a container handling vehicle. Hence, the spacers can be moved by means of the container handling vehicles in the same way as the storage containers.

The spacers may also comprise upper and lower stacking interfaces similar to the storage containers, thereby allowing the spacers to be stacked in the same stacks as the storage containers.

Each spacer may comprise a first frame structure providing support in a first direction and a second frame structure providing support in a second direction different from the first direction.

In one aspect, the flow path has an inlet into the storage volume and/or an outlet out of the storage volume.

The inlet and/or outlet may be at a periphery of the storage grid. The flow path may extend into an interior region of the storage grid, and/or may extend between different sides of the storage grid. The inlet/outlet might also be from the top of the grid e.g. if the flow path connected to an empty column, or if multiple spacers were stacked on top of each other to provide a vertical flow path. Alternatively, the flow paths might be entirely internal to the storage grid. A fire suppression system could be arranged to flood the internal flow paths, or an environmental control system could be arranged to operate more efficiently in a substantially enclosed space e.g. because less cold air would be lost outside the storage grid. The outward flow from the internal flow paths might help to maintain controlled atmospheres, e.g., for keeping groceries fresher.

In one aspect, the system comprises a plurality of flow paths arranged within the storage volume, each flow path being provided at a different level in the stacks.

Each of the plurality of fluid flow paths may be provided by a set of spacers stacked at the same level in the stacks, between storage containers. The plurality of flow paths may be positioned at intervals in the stacks, for example at every third level, every fourth level and so on.

In one aspect, the flow path extends through an entire level of the storage grid.

An entire level of the storage grid may be provided by spacers and the flow path may be open on all sides of the storage grid. In this way, all storage containers in two entire levels may be adjacent a flow path. Multiple flow paths may be provided in the storage grid so that a significant proportion of the storage containers are adjacent flow paths. The storage volume may comprise a plurality of flow paths so that each storage container is adjacent a flow path. For example, flow paths may be provided every third level of the stacks and across the whole of each level, so that all storage containers will either be immediately above a flow path, or immediately below.

In one aspect, the system comprises a fire suppression system arranged to deploy suppressant and/or inert gas to flow through the flow path in the event of a fire.

A suppressant may therefore be quickly flushed through the storage grid by appropriate arrangement of the spacers and flow paths.

In one aspect, the spacers are formed of a fire retardant material, such as a metal, a fire retardant plastic or ceramic.

The flow path may therefore be maintained in the event of a fire that might otherwise damage or deform the spacers and potentially block the flow paths.

In one aspect, the storage column comprises a plurality of spacers stacked on top of each other.

The spacers may be arranged to allow a fluid to flow through their bases and may be stacked on top of one another to allow a fluid to flow up and/or down storage columns. Spacers may be provided connecting flow paths on different levels of the storage grid.

The present invention also relates to a method of storing storage containers in storage columns of an automated grid based storage and retrieval system, wherein spacers are introduced into a plurality of stacks of storage containers at a predetermined level in the storage columns, each spacer being configured to allow a fluid to flow through the spacer, wherein the spacers are arranged adjacent each other in neighboring stacks to create a flow path through the storage columns of the grid based storage and retrieval system.

In one aspect, spacers are introduced at different levels in a stack of storage containers to provide sections of flow path at different levels within a storage column of the grid based storage and retrieval system.

The spacers may be separated in a stack by an integer multiple number of storage containers, preferably three or more storage containers. A plurality of storage columns may comprise spacers at different levels.

In one aspect, the method comprises the steps of lifting a spacer from a storage column, retrieving a storage container from a level that was beneath the spacer, lowering a different storage container in to the position of the retrieved storage container, and returning the spacer to its original level in the stack.

According to another aspect of the invention there is provided a method of rearranging a flow path through stacks of storage containers of an automated grid based storage and retrieval system, the method comprising removing a spacer from a stack of storage containers and replacing the spacer in the stack at a different level, or placing the spacer in a different stack to reposition a section of flow path.

The method may comprise repositioning spacers throughout the storage system to change a flow path through the system.

BRIEF DESCRIPTION OF THE DRAWINGS

Following drawings are appended to facilitate the understanding of the invention. The drawings show embodiments of the invention, which will now be described by way of example only, where:

FIG. 9a is a perspective view of a first embodiment of a spacer.

FIG. 9b is a perspective view of a stack with a bottom spacer, three storage containers of the embodiment of FIG. 9a stacked above the bottom spacer, then one spacer again and then an upper storage container.

FIG. 10a is a perspective view of a second embodiment of a spacer.

FIG. 10b is a perspective view of a stack with a bottom spacer and two storage containers of the embodiment of FIG. 10a stacked above the bottom spacer.

FIG. 15 illustrates the side surfaces of the spacer and the cross sectional area of its through ventilation opening.

FIG. 16a-d illustrate side views of alternative embodiments of the spacer.

DETAILED DESCRIPTION OF THE INVENTION

Figure 1:
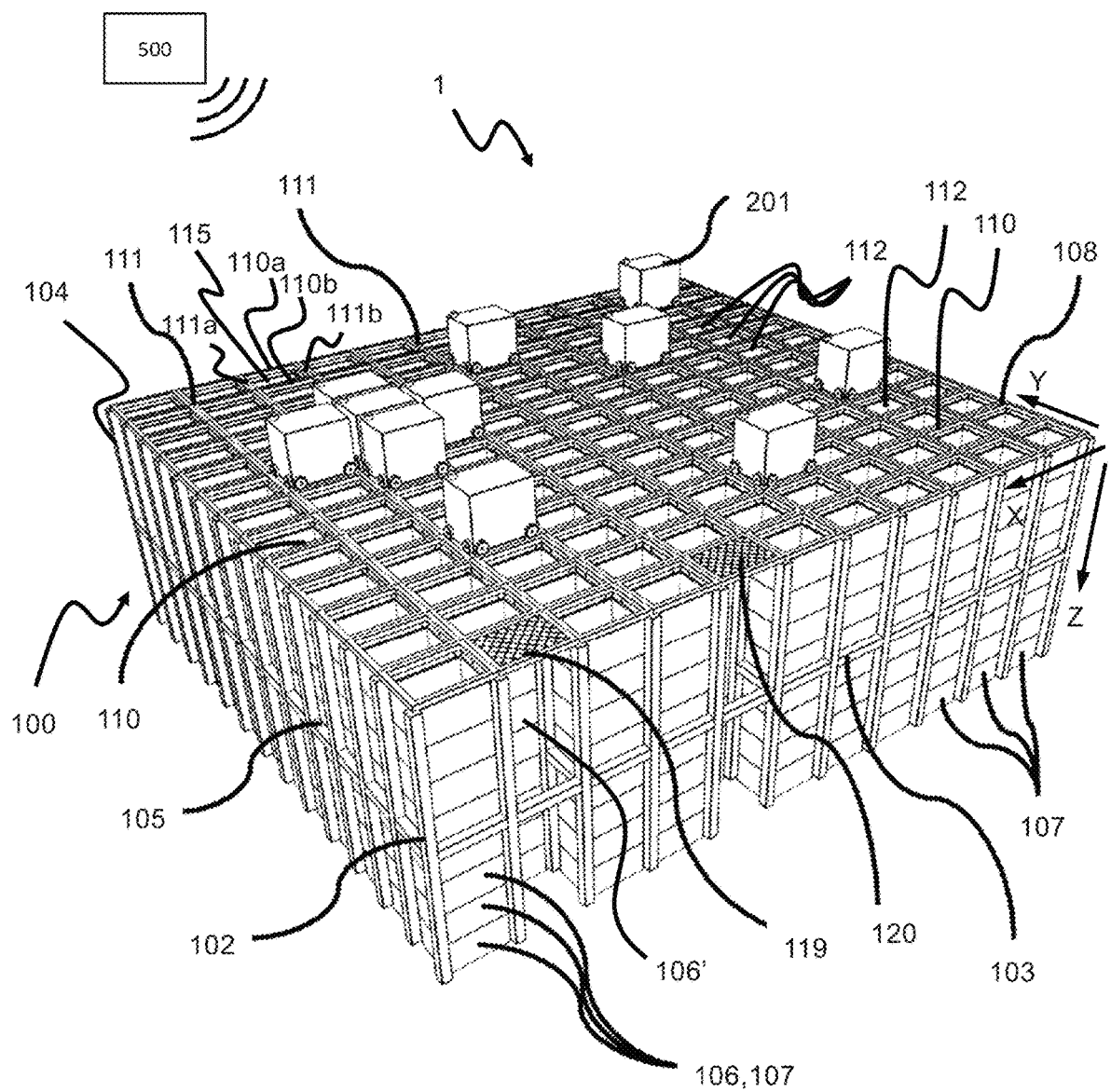
FIG. 1 is a perspective view of a grid of a prior art automated storage and retrieval system.
Figure 2:
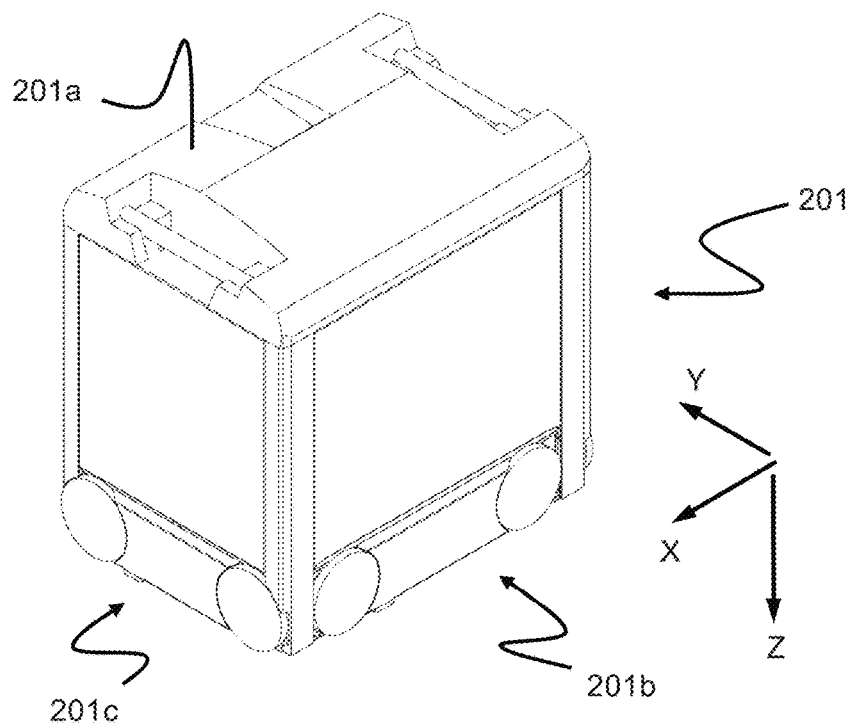
FIG. 2 is a perspective view of a prior art container handling vehicle having a centrally arranged cavity for containing storage containers therein.
Figure 3:
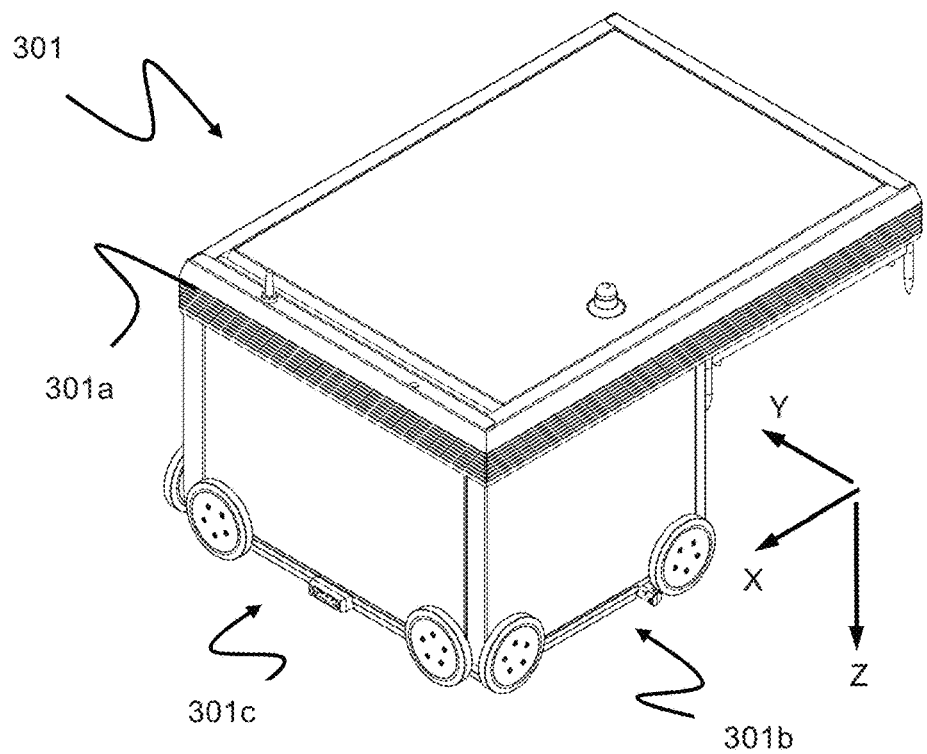
FIG. 3 is a perspective view of a prior art container handling vehicle having a cantilever for containing storage containers underneath.

In the following, embodiments of the invention will be discussed in more detail with reference to the appended drawings. It should be understood, however, that the drawings are not intended to limit the invention to the subject-matter depicted in the drawings.

Figure 4:
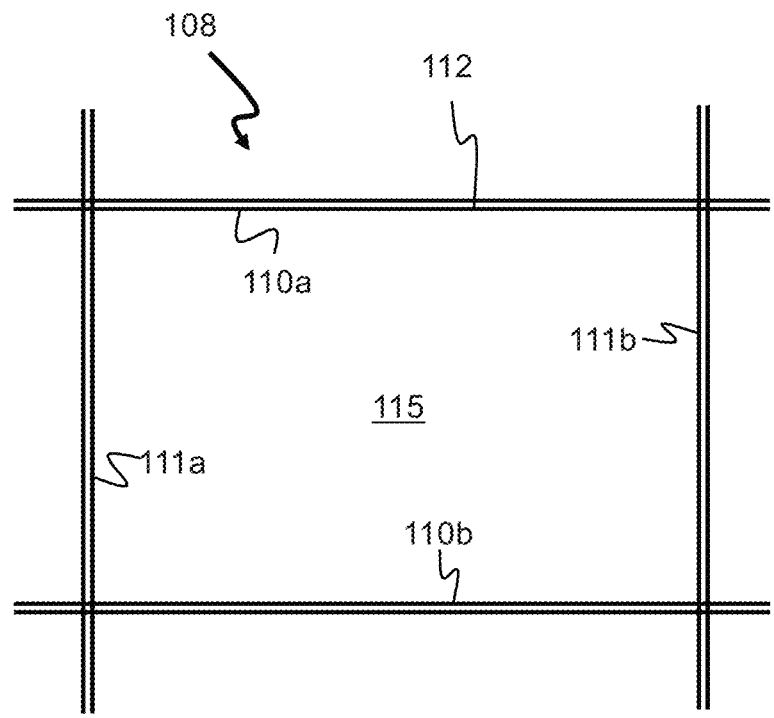
FIG. 4 is a top view of a prior art single rail grid.
Figure 5:
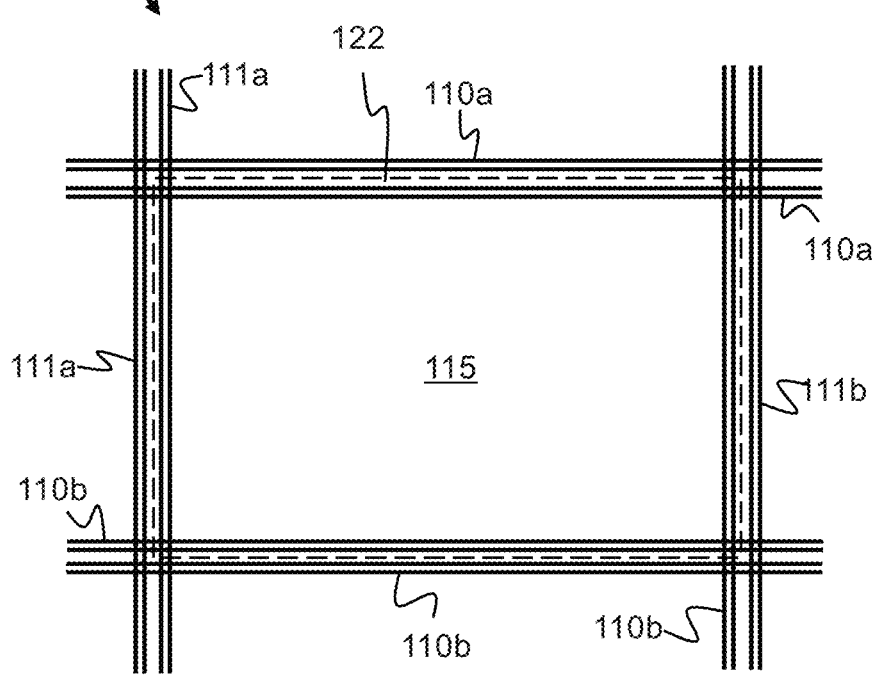
FIG. 5 is a top view of a prior art double rail grid.
Figure 6:
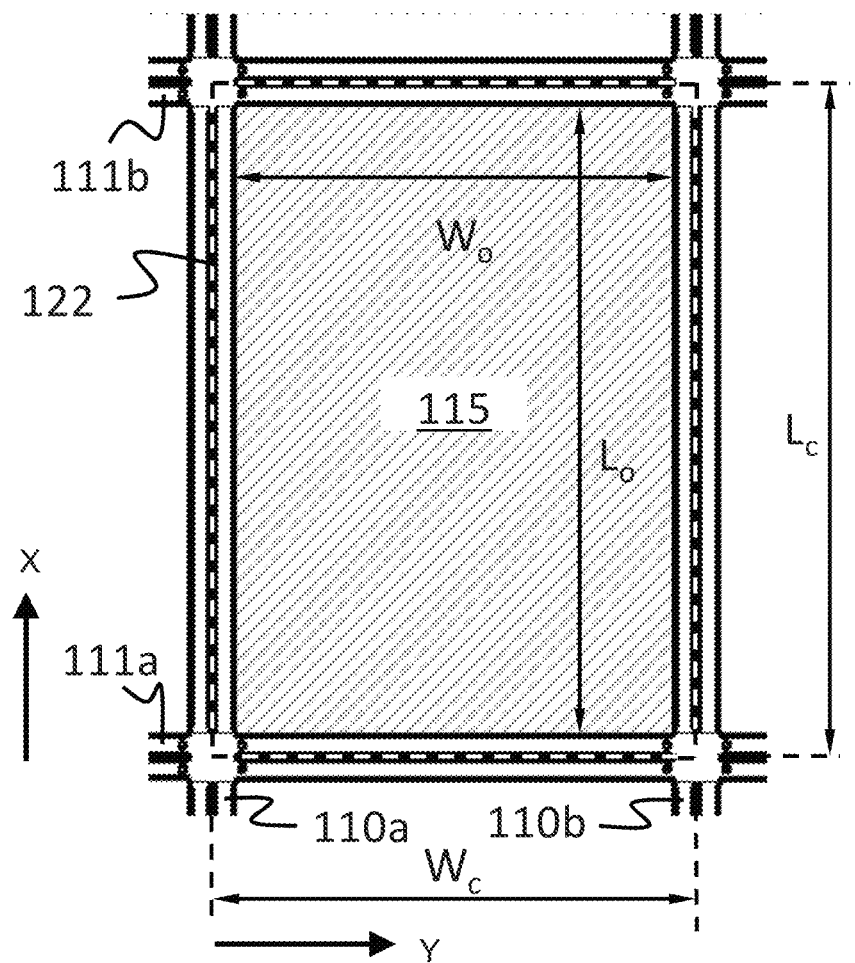
FIG. 6 is a top view of a track system of the automated storage and retrieval system according to FIG. 1.

The framework 100 of the automated storage and retrieval system 1 is constructed in accordance with the prior art framework 100 described above in connection with FIGS. 1-6, i.e. a number of upright members 102 and a number of horizontal members 103, which are supported by the upright members 102, and further that the framework 100 comprises a track system 108 of parallel tracks 110,111 in X direction and Y direction arranged across the top of storage columns 105/grid columns 112. The horizontal area of a grid column 112, i.e. the area along the X and Y directions, may be defined by the distance between adjacent rails 110 and 111, respectively (see FIGS. 4-6).

In FIG. 1 the grid 104 is shown with a height of eight cells. It is understood, however, that the grid 104 in principle can be of any size. In particular it is understood that grid 104 can be considerably wider and/or longer and/or deeper than disclosed in FIG. 1. For example, the grid 104 may have a horizontal extent of more than 700×700 grid cells and a depth of more than twelve grid cells.

One embodiment of the automated storage and retrieval system according to the invention will now be discussed in more detail with reference to FIGS. 7 to 15.

Figure 7A:
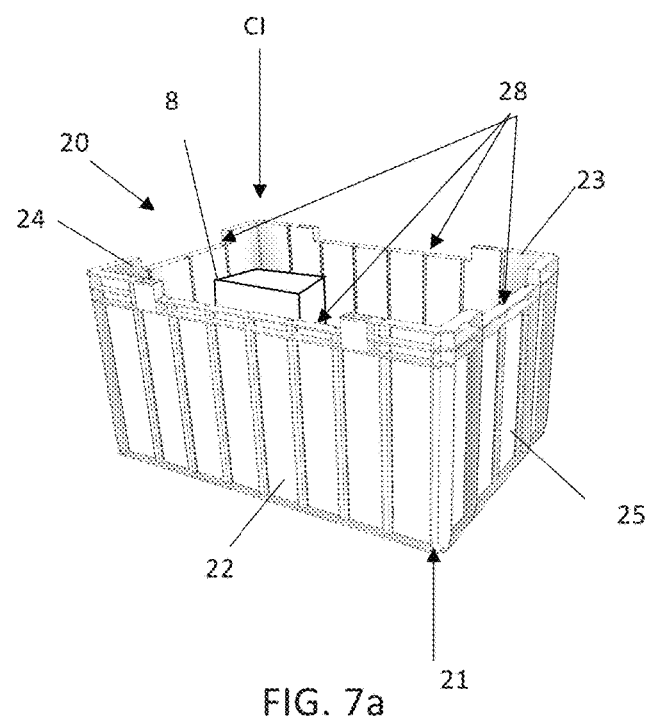
FIG. 7a is a perspective view of a first embodiment of a storage container in which product items are stored.

Initially, it is referred to FIG. 7a, where a first embodiment of a storage container 20 for storing product items 8 is disclosed. Containers with the purpose of storing product items 8 will hereinafter be referred to as storage containers.

The storage container 20 comprises a bottom structure 21 and four side walls 22, 23, 24, 25 protruding upwardly from the bottom structure 21. The upper parts of at least some of the side walls comprises a connection interface used by the container handling vehicles 201, 301 to elevate the storage container 20 from the grid to the upper level of the grid, and to lower the storage container 20 from the upper level of the grid to a storage position within the grid. In addition, the upper parts of at least some of the side walls comprises a stacking interface adapted to the bottom structure 21 of another storage container, thereby ensuring a safe and reliable stacking of such storage containers 20.

The storage container 20 is based on the prior art containers 106 described above and will not be described in detail herein. One difference should be mentioned. The storage container 20 comprises a cut out or recess 28 in the upper part of each sidewall 22, 23, 24, 25.

Figure 7B:
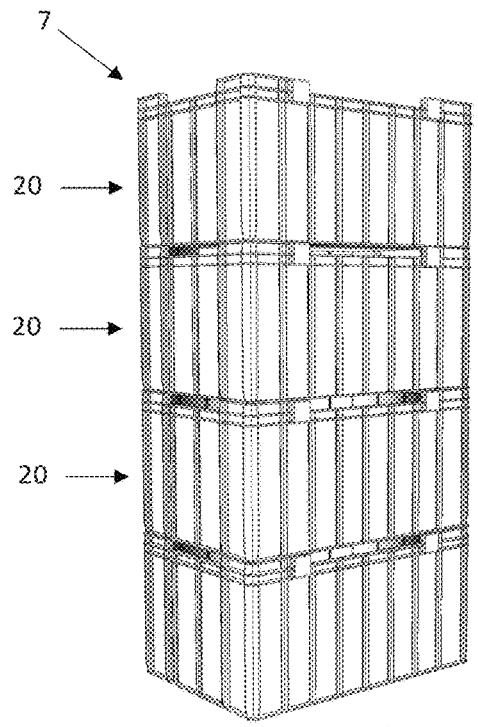
FIG. 7b is a perspective view of four storage containers of FIG. 7a stacked above each other.

It is now referred to FIG. 7b. Here it is shown that when the storage container 20 is stacked above each other, each cut-out or recess 28 forms an opening allowing air to enter and exit the storage container 20.

It should be noted that as these cut-outs or recesses are relatively small, and that product items stored within the container may obstruct the cut-outs or recesses, the air replacement rate of the air inside the container may be relatively low.

Figure 8A:
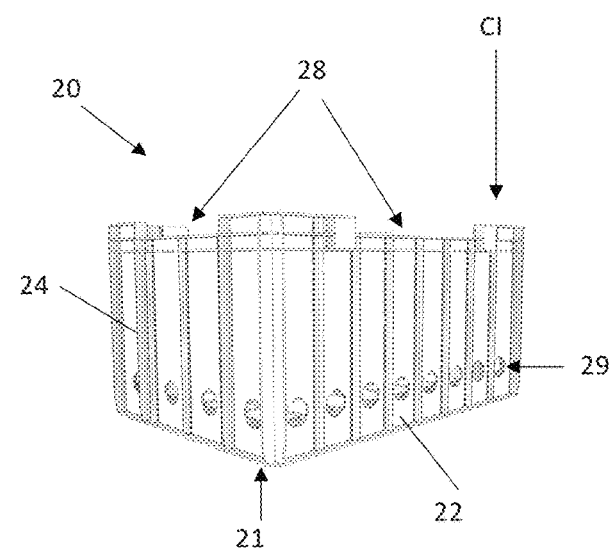
FIG. 8a is a perspective view of a second embodiment of a storage container in which product items are stored.
Figure 8B:
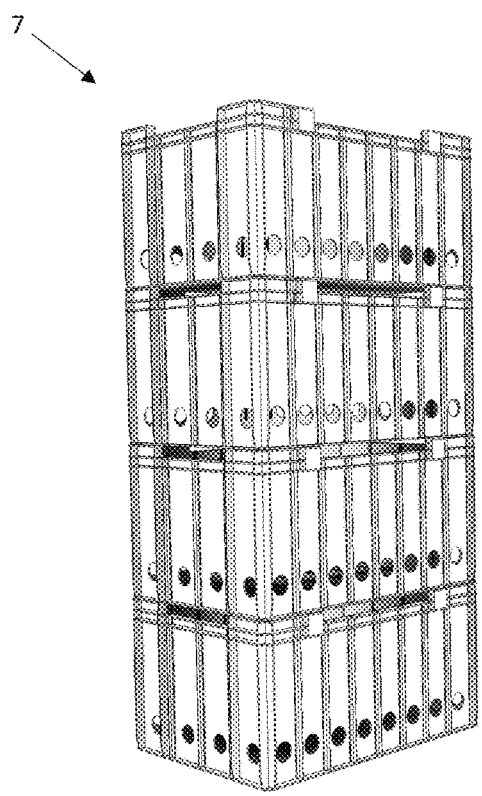
FIG. 8b is a perspective view of four storage containers of FIG. 8a stacked above each other.

It is now referred to FIGS. 8a and 8b, where a second embodiment of the storage container 20 is shown. The second embodiment corresponds to the first embodiment 20 of FIG. 7a, with one difference: The second embodiment of the storage container 20 comprises additional apertures 29 in the lower part of each sidewall 22, 23, 24, 25. It is therefore expected a higher air replacement rate for the second embodiment. However, also here product items 8 may effectively obstruct the apertures 29 as well as the cutouts or recesses 28.

Hence, the above first and second embodiments of the storage containers 20 are considered suitable for storing product items 8, but may be limited with respect to how much fluid that can flow through them.

It is now referred to FIGS. 9a and 9b, where a first embodiment of a spacer 40 is shown. The purpose of the spacer 40 is to provide a space in a stack 7 of storage containers 20. This space is used to allow a fluid to flow through the stack 7. Such a fluid flow is indicated in FIG. 9b as a fluid path FP.

The spacer 40 of FIG. 9a comprises a first frame structure 41 for providing support in a horizontal direction and a second frame structure 50 providing support in a vertical direction. The first frame structure 41 here comprises a lower plate structure, while the second structure 50 comprises four sidewalls 51, 52, 53, 54 each comprising an opening O51, O52, O53, O54.

The spacer 40 comprises a connection interface CI configured to be connected to a container handling vehicle 201, 301. Hence, the spacers 40 can be moved by means of the container handling vehicles 201, 301 in the same way as the storage containers 106, 20. The connection interface CI is considered known from prior art and will not be described further in detail.

The spacer 40 also comprise upper and lower stacking interfaces SI similar to the storage containers 106 20, thereby allowing the spacer 40 to be stacked in the same stacks as the storage containers 106, 20. The stacking interface SI is considered known from prior art and will not be described further in detail.

Preferably, the outline of the spacer is similar to the outline of the storage containers 106, 20. However, they can also be different. For example, the height of a spacer 40 may be smaller than the height of a storage container 106, 20. It is also possible that the height of the spacer 40 is higher than the height of a storage container 106, 20. This may require a special-purpose spacer handling vehicle (not shown).

A second embodiment of the spacer 40 is shown in FIGS. 10a and 10b. Only differences with respect to the first embodiment will be described below.

The second embodiment of the spacer 40 comprises a first frame structure 41 similar to the first embodiment. However, the second frame structure 50 here comprises four vertical posts 61, 62, 63, 64 provided in each corner of the first frame structure. These posts, together with the plate structure 41 and a storage container 106, 20 or further spacer 40 stacked above the spacer 40 forms openings through the spacer 40 which are creating a fluid path FP as shown in FIG. 10b.

Figure 11:
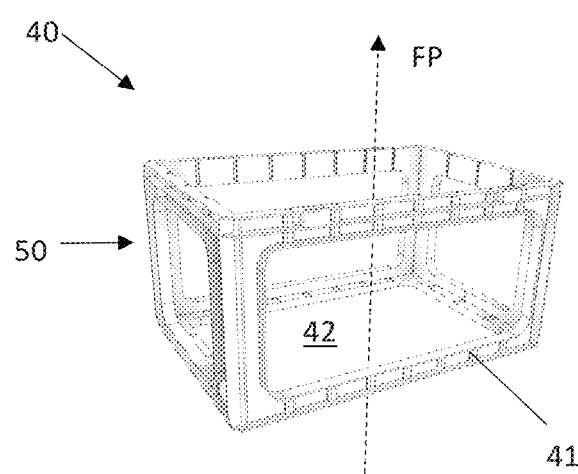
FIG. 11 is a perspective view of a third embodiment of a spacer.

A third embodiment of the spacer 40 is shown in FIG. 11. This embodiment is similar to the first embodiment described above. Here an opening 42 is provided in the first supporting structure 41, which is creating a vertical fluid path FP in addition to the horizontal fluid paths (indicated in FIG. 9b).

Figure 12:
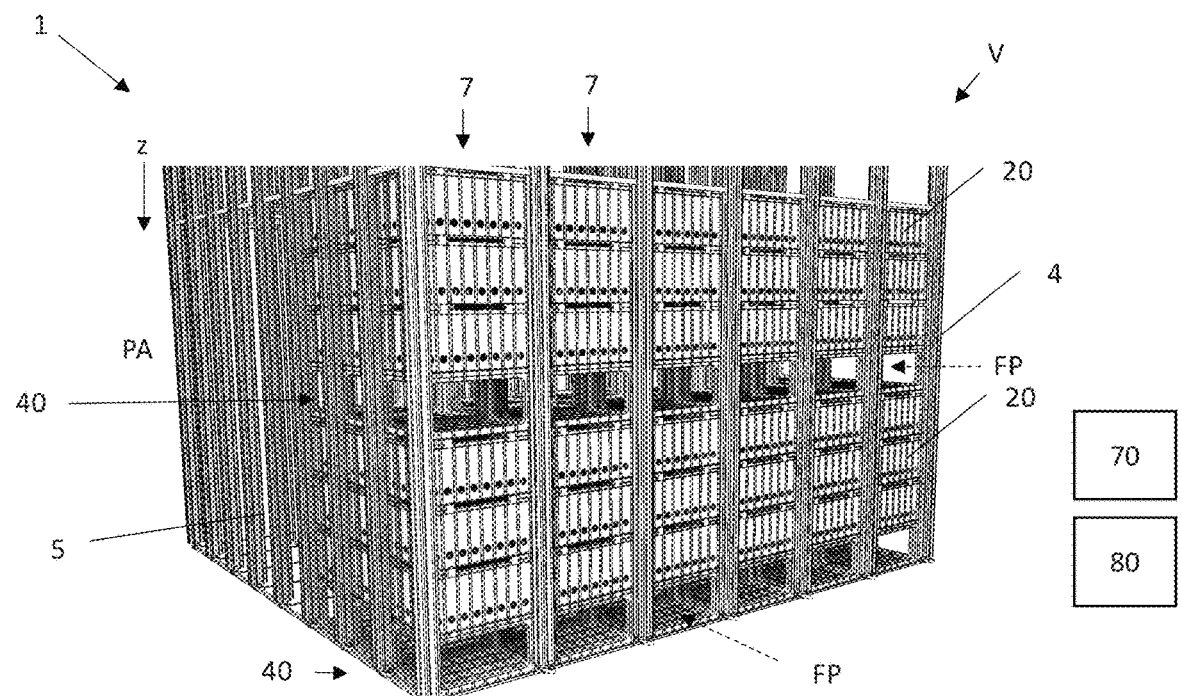
FIG. 12 is a perspective view of a storage and retrieval system in which spacers and storage containers are stored.
Figure 13:
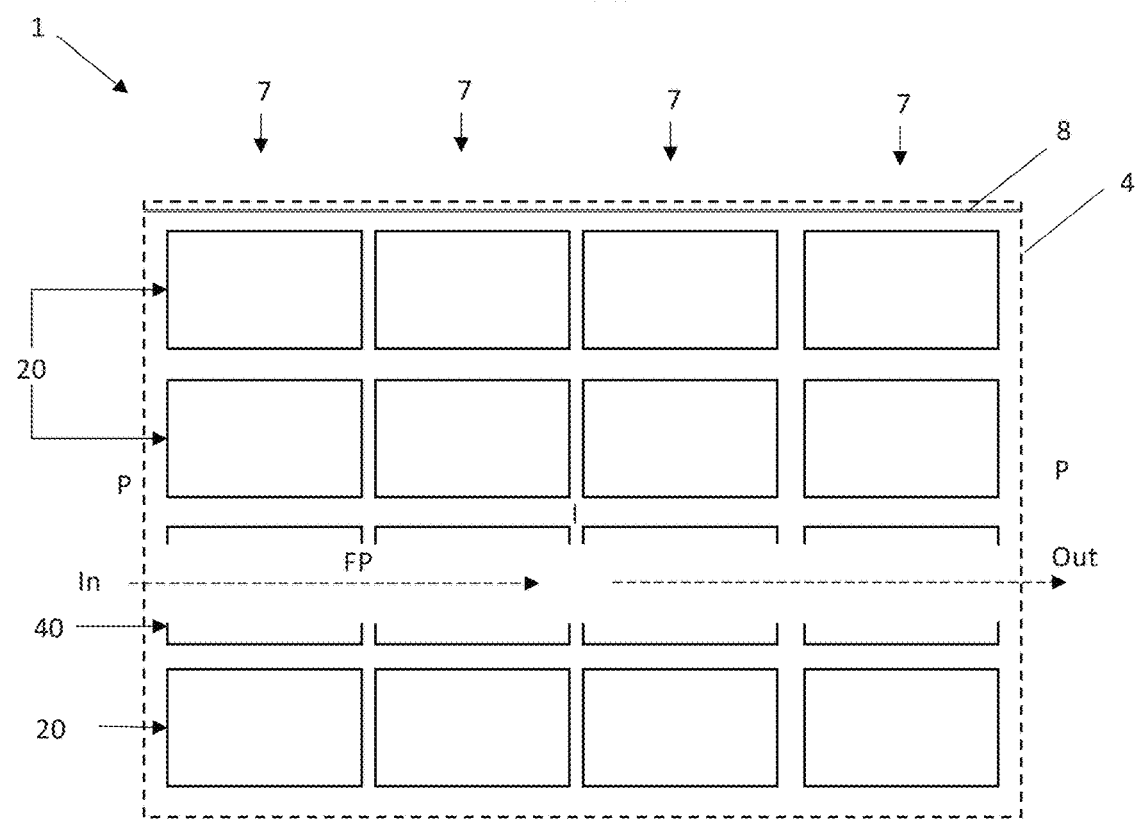
FIG. 13 is a schematic side view of a simplified storage and retrieval system, in which a horizontal ventilation channel is provided.

It is now referred to FIGS. 12 and 13. Here, an automated grid based storage and retrieval system 1 according to the present invention is shown with a plurality of storage containers 20 in which product items 8 are stored and a storage grid 4 in which the storage containers 20 are stacked vertically in stacks 7.

Similar to the storage system of FIG. 1, also this system 1 comprises a rail system 8 on which container vehicles may move vertically. Openings are provided in this rail system 8 to get access to the containers in the stack. In the grid 4 storage columns 5 are defined, where these storage columns 5 together form a storage volume V.

The grid 4, storage columns 5, stacks 7 and rail system 8 are considered prior art and corresponds to respective reference numbers 104, 105, 107, and 108 of FIG. 1.

As shown in FIGS. 12 and 13, spacers 40 are positioned at predetermined levels z within the stacks 7. As described above, each spacer 40 is configured to allow a fluid to flow through the spacer 40, thereby forming a section of a fluid path FP. As the spacer is located adjacent to other spacers 40, the storage volume V is considered to comprise a flow path FP extending through a plurality of the stacks 7.

In FIG. 12, it is shown that the bottom level of the storage volume V comprises a fluid path FP formed by a horizontal layer of adjacent spacers 40. Above each spacer 40 three storage containers 20 are stacked. Above these three storage containers 20, yet a spacer 40 is stacked and then three storage containers 20 again.

The above embodiments of the spacer 40 is unsuitable for storing product items, as product items 8 would fall out from the spacers 40, in particular when the spacers are accelerated and decelerated during horizontal movement by means of vehicles 201, 301 along the rails 8. The third embodiment shown in FIG. 11 will also be unsuitable for storing product items 8 due to the opening 42 in the bottom structure 41. Hence, the spacers 40 are dedicated for the purpose of providing fluid flow through the storage volume V.

In FIGS. 12 and 13, it is shown that the flow path FP is directed from an inlet In at the periphery P of the storage volume V to the interior I of the storage volume and further to an outlet Out at the periphery P on the opposite side of the inlet In.

The fluid may be distributed through the fluid path FP passively, i.e. without any fans that are blowing air into or sucking air out from the storage volume V. This may be an option when the system 1 is installed in a building provided with windows in walls/roofs that can be opened, and/or ventilation hatches. Of course, the opening of windows can be performed manually or automatically. Hatches can be permanently open, or they can be opened and closed manually or automatically.

Alternatively, the fluid may be distributed through the fluid path FP actively, for example by means of fans etc. being a part of a ventilation system indicated in FIG. 12 as a box 70. The ventilation system 70 may be an air conditioning system, a refrigeration system, an air heating system etc. and is considered known for a person skilled in the art.

The system 1 may also comprise a fire suppression system 80 indicated by a box 80 in FIG. 12. The fire suppression system 80 is arranged to deploy suppressant and/or inert gas to flow through the flow path in the event of a fire. A suppressant may therefore be quickly flushed through the storage grid by appropriate arrangement of the spacers 40 and flow paths FP.

In addition, the spacers 40 may be formed of a fire retardant material, such as a metal or ceramic. The flow path may therefore be maintained in the event of a fire that might otherwise damage or deform the spacers 40 and potentially block the flow paths.

The spacers 40 can be arranged as needed within the stacks 7 to provide flow paths FP through or to predetermined regions of the storage volume V.

Figure 14:
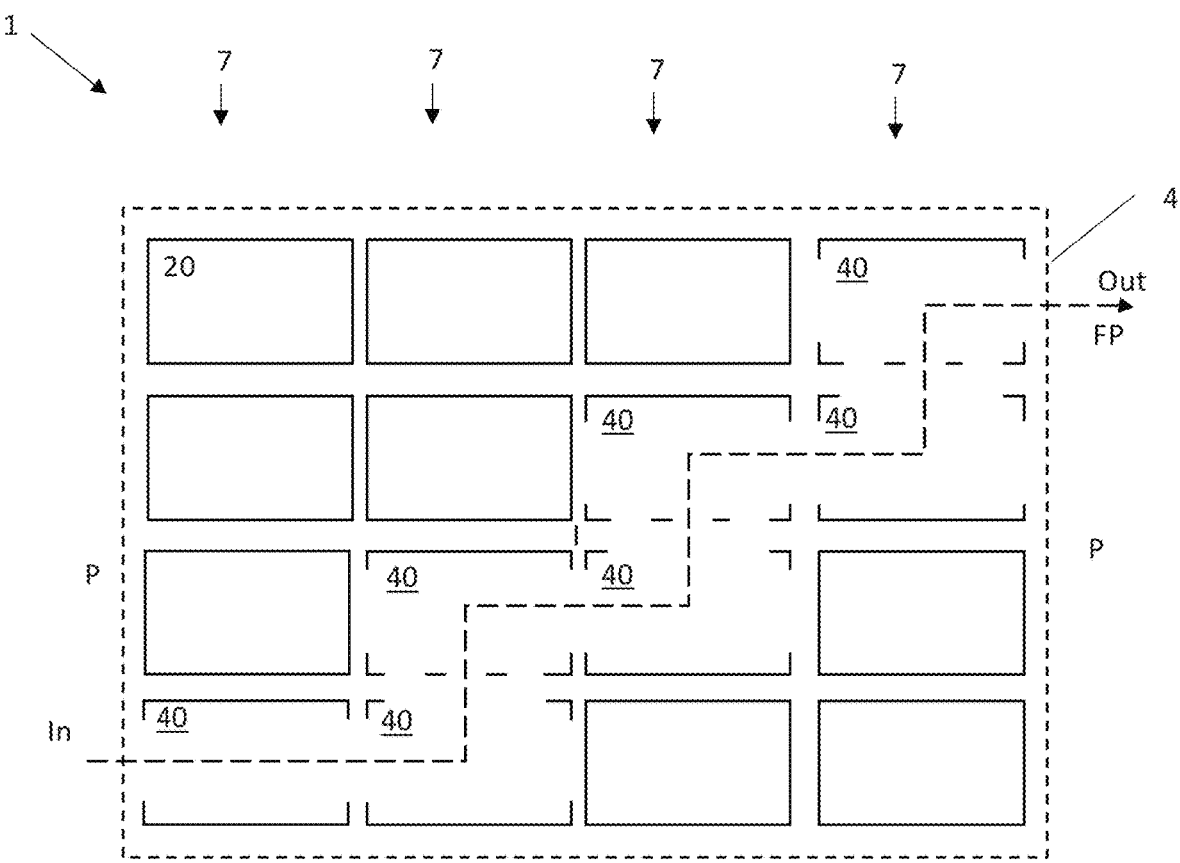
FIG. 14 is a schematic side view of a simplified storage and retrieval system, in which an inclined ventilation channel is provided.

An alternative fluid path FP is shown in FIG. 14. Here, the third embodiment described above is used, allowing fluid to flow not only horizontally, but also vertically. Hence, by the pattern of spacers 40 shown in FIG. 14, a substantially inclined fluid path FP is achieved.

A vertical fluid path FP is also possible, either by stacking several spacers 40 of the third embodiment above each other, or by removing spacers 40 and storage containers 20 from the columns 5.

It is now referred to FIG. 15, where the outline or contour of a spacer is shown with dashed lines. Here, there are four side surfaces A1-A4, where the side surface A1 has its opening O indicated as a shaded area AO. This area AO may be at least 50% of the side's surface area, at least 70% of the side's surface area, at least 80% of the side's surface area, and/or at least 90% of the side's surface area.

It is now referred to FIG. 16a-d, where yet alternative embodiments of the spacer 40 are shown.

In FIG. 16a, the spacer 40 comprises a first horizontal frame structure 41 connected to the center of posts 61, 62 forming the second structure 50. Here, the side view of the spacer 40 resembles an "H"-shaped structure.

In FIG. 16b, the spacer 40 is similar to FIG. 16a, i.e. it resembles an "H"-shaped structure. However, the first and second structures are here turned 90°.

In FIG. 16c, the first frame structure 41 is inclined between a lower part of a first post 61 and an upper part of a second post 62. Here, the side view of the spacer 40 resembles an "N"-shaped structure.

In FIG. 16d, the spacer comprises two inclined structures, where the side view of the spacer 40 resembles an "X"-shaped structure.

The operation of the above system 1 will now be described. First, it should be noted that the control system 500 of the system 1 keep track of each of the storage containers 106, 20 as described above, either by keeping control of the X, Y, Z position of each storage container, or by an identifier of each storage container. In the similar way, the control system 500 will also be able to keep track of each spacer 40.

The control system 500 will be configured to use the container handling vehicles to stack the spacers at a predetermined level or position in the storage columns 5. As stated above, the spacers 40 are arranged adjacent each other in neighboring stacks to create a flow path FP through the storage columns 5 of the system 1.

When a storage container 106, 20 below a spacer 40 is to be retrieved, then the spacer 40 together with other spacers/containers above the spacer 40, must be lifted and transported to other positions in the grid. Then a different storage container or spacer must be lowered into the position of the retrieved storage container 106, 20 before the spacer 40 (either the original spacer 40 or another spacer 40) is returned to its original level in the stack.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

REFERENCE NUMERALS

1 Gridbased storage and retrieval system
4 Storage grid
5 Storage column
7 Stacks
8 Rail system
20 Storage container
21 Bottom structure
22-25 Side walls
28 Recess
29 Aperture
40 Spacer
41 First frame structure
42 Opening
50 Second frame structure
51-54 Side walls
61-64 Posts
70 Ventilation system
80 Fire suppression system
100 Framework structure
102 Upright members of framework structure
103 Horizontal members of framework structure
104 Storage grid
105 Storage column
106 Storage container
106' Particular position of storage container
107 Stack
108 Rail system/track system
110 Parallel tracks in first direction (X)
110a First track of neighboring tracks 110
110b Second track of neighboring tracks 110
111 Parallel tracks in second direction (Y)
111a First track of neighboring tracks 111
111b Second track of neighboring tracks 111
112 Grid column
115 Grid opening
119 First port column/first port
120 Second port column/second port
122 Grid cell/storage cell
201 Prior art single cell storage container vehicle
201a Vehicle body of the storage container vehicle 101

201*b* Drive means/wheel arrangement, first direction (X)
201*c* Drive means/wheel arrangement, second direction (Y)
301 Prior art cantilever storage container vehicle
301*a* Vehicle body of the storage container vehicle 101
301*b* Drive means in first direction (X)
301*c* Drive means in second direction (Y)
X First direction
Y Second direction
Z Third direction
P Horizontal plane
D Distance from termination of charging station column's lower end to the lowermost part of the power supply support
L Distance from the outer perimeter of the charging station column to a geometrical size of the power supply and/or the horizontal center point of the vehicle under charge.
FP Flow path
In Inlet
Out Outlet
V Storage volume
SI Stacking interface
CI Connection interface

The invention claimed is:

1. An automated grid based storage and retrieval system, comprising:
   a plurality of storage containers for storing product items therein;
   a plurality of spacers, wherein each spacer of the plurality of spacers comprises a plurality of sidewalls and a bottom structure, wherein each sidewall of the plurality of sidewalls has an opening extending from a first end of each sidewall to a second, opposite end of each sidewall, and comprising at least seventy percent of a surface area of each sidewall, and wherein the bottom structure includes a bottom opening extending from a first side of the bottom structure to a second side of the bottom structure, the second side opposite to the first side, the bottom opening dimensioned such that each spacer does not store the product items therein;
   a storage grid in which the plurality of storage containers are stacked vertically in stacks arranged beneath openings of a grid-based rail system to provide storage columns of a storage volume;
   wherein the storage volume comprises a flow path extending through the stacks,
   wherein the flow path is formed by spacers positioned within the stacks,
   the spacers being configured to allow a fluid to flow through the spacers, each spacer of the spacers being stacked at a predetermined level between storage containers in one of the stacks and adjacent another at least one of the spacers in a neighboring stack to provide adjacent sections of the flow path.

2. The automated grid based storage and retrieval system according to claim 1, wherein each spacer of the spacers is arranged to define a void within the stacks by supporting one or more storage containers above each spacer to allow fluid flow through the stacks via each spacer.

3. The automated grid based storage and retrieval system according to claim 1, wherein the flow path has an inlet into the storage volume and/or an outlet out of the storage volume.

4. The automated grid based storage and retrieval system according to claim 1, comprising a plurality of flow paths arranged within the storage volume, each flow path of the plurality of flow paths being provided at a different level in the stacks.

5. The automated grid based storage and retrieval system according to claim 1, wherein the flow path extends through an entire level of the storage grid.

6. The automated grid based storage and retrieval system according to claim 1, comprising a fire suppression system arranged to deploy suppressant or inert gas to flow through the flow path in event of a fire.

7. The automated grid based storage and retrieval system according to claim 1, wherein the spacers are formed of a fire retardant material.

8. The automated grid based storage and retrieval system according to claim 1, wherein at least one of the storage columns comprises a plurality of the spacers stacked on top of each other.

9. A method of storing storage containers in storage columns of an automated grid based storage and retrieval system, wherein spacers are introduced into a plurality of stacks of storage containers at a predetermined level in the storage columns, wherein each spacer of the spacers comprises a plurality of sidewalls and a bottom structure, and wherein each sidewall of the plurality of sidewalls has an opening extending from a first end of each sidewall, opposite end of each sidewall, and comprising at least seventy percent of a surface area of each sidewall, wherein the bottom structure includes an opening extending from a first side of the bottom structure to a second side of the bottom structure, the second side opposite to the first side, the bottom opening dimensioned such that each spacer does not store product items therein, and each spacer of the spacers being configured to allow a fluid to flow through each spacer, wherein the spacers are arranged adjacent each other in neighboring stacks to create a flow path through the storage columns of the automated grid based storage and retrieval system.

10. The method according to claim 9, wherein the spacers are introduced at different levels in at least one of the stacks of storage containers to provide sections of the flow path at the different levels within a corresponding at least one of the storage columns of the automated grid based storage and retrieval system.

11. The method according to claim 9, comprising lifting a spacer of the spacers from at least one storage column of the storage columns, retrieving a storage container of the storage containers from a level that was beneath the spacer, lowering a different storage container of the storage containers into a position of the retrieved storage container, and returning the spacer to an original level of the spacer in the at least one storage column.

* * * * *